Dec. 9, 1969  G. SEULEN ET AL  3,483,346
INDUCTOR FOR SURFACE HARDENING FLANGED ELONGATE WORKPIECES
Filed April 1, 1968  3 Sheets-Sheet 1
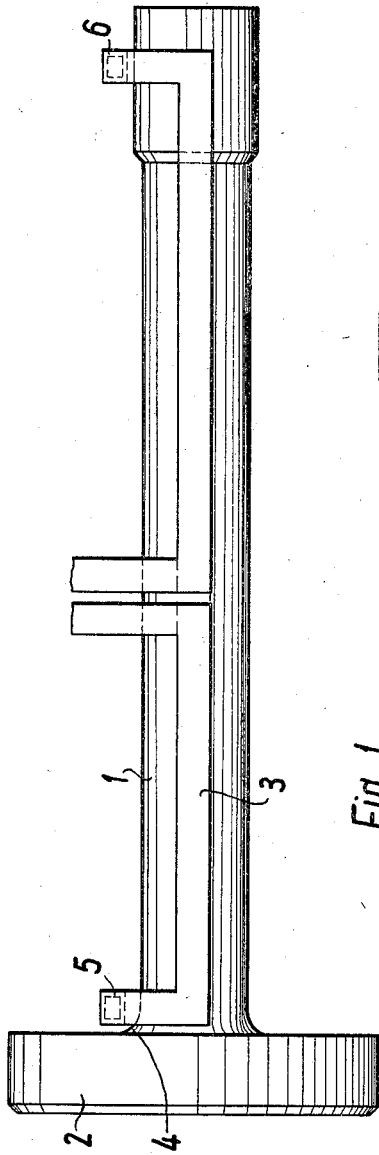
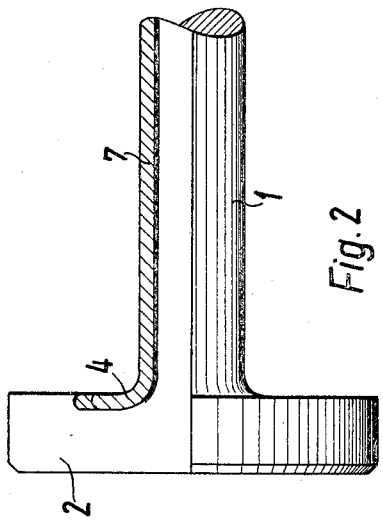
Inventors
GERHARD SEULEN
FRIEDHELM REINKE
KARL W. FRISCH
By FRITZ OERTEL
Cushman, Darby & Cushman
ATTORNEYS

# United States Patent Office 3,483,346
Patented Dec. 9, 1969

3,483,346
INDUCTOR FOR SURFACE HARDENING FLANGED ELONGATE WORKPIECES
Gerhard Seulen, Friedhelm Reinke, and Karl W. Frisch, Remscheid, and Fritz Oertel, Huckeswagen, Germany, assignors to AEG-Elotherm G.m.b.H., Remscheid-Hasten, Germany
Filed Apr. 1, 1968, Ser. No. 717,865
Claims priority, application Germany, Nov. 10, 1967, A 57,336
Int. Cl. H05b 5/00, 9/06
U.S. Cl. 219—10.43                 6 Claims

ABSTRACT OF THE DISCLOSURE

Axially symmetrical workpieces comprising a shaft and a flange at at least one end thereof, are inductively heated to produce a hardened zone on the flange beyond the fillet joining the flange to the shaft, by an inductor comprising two elongate parallel inductors joined by a U-shaped cross-piece lying adjacent the flange, the shanks of the cross-piece being sufficiently long so that the shank connecting portion is at a distance to heat the flange beyond the fillet portion, i.e. in a position which avoids flexure and resulting failure in service.

---

Figure 4:
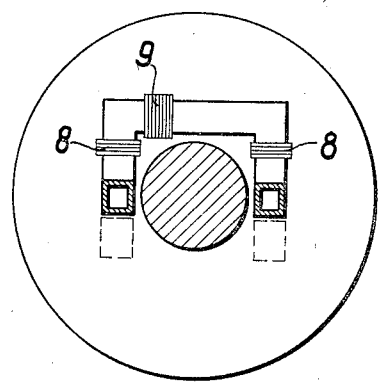

This invention relates to the inductive surface hardening of elongate workpieces formed at least at one end with a plate-shaped flange, which may be flat, or convexly or concavely arched.

Such workpieces which serve for instance as half-shafts for the rear axles of vehicles, are required to have a shaft portion provided with a hardened surface layer of uniform depth extending into the region of the radius at the junction between the shaft and the flange, known as the fillet, and possibly extending into the face of the flange.

The object of such an extended hardened zone is to strengthen the entire surface region which in such a workpiece is subjected to mechanical stress, and to extend the hardened zone to a point sufficiently far into the face of the flange where reverse bending stress peaks do not occur in service.

For inductively heating the shaft surface of such workpieces to a hardening temperature to obtain such extended hardened zones, a method of overall heating of the rotating workpiece, i.e. by inductive heating with a stationary straight or hairpin type inductor whilst the workpiece rotates between centres has been proposed using inductors of the form illustrated in longitudinal section in FIGURE 1 of the accompanying drawings, wherein the shaft 1 of the workpiece is formed with a flange 2 at one end, is located in the effective heating range of an inductor forming a loop over one side of the workpiece surface, the said inductor comprising two elongated heating conductors 3 extending parallel to the shaft. In the region adjacent the fillet 4 the two heating conductors are conductively connected by a semi-circular transverse conductor 5, which exerts a localised heating effect on the surface of the fillet. The heating conductors are connected at 6 in conventional manner to a medium frequency generator designed to provide voltages and currents at frequencies up to 20 kc./s. Such heating conductors are usually made of hollow copper tubing or copper sections through which a liquid coolant can be conducted. For concentrating the heating energy on particular surface areas, the heating conductors may be fitted in a manner that is likewise well understood, with L- and/or U-shaped sheet iron laminations arranged in stacks. The longer shanks of the L- or U-shaped sheet metal laminations point towards the surface that is to be heated.

Such an inductor arrangement is however not suitable for inductively heating workpieces as shown in FIG. 1 but so that they have hardened zones of the kind illustrated in FIGURE 2, in which the workpiece at one end comprises a plate-shaped solid flange of a diameter considerably greater than that of the elongate shaft and which are of considerable length compared with their diameter. In FIGURE 2, only a short portion of the length of the shaft is shown. The object is to provide such a workpiece with a hardened zone of the kind indicated by reference numerals 7, 4. A further difficulty which is imposed is that the inductor should be so designed that the said surface layer can be satisfactorily heated using a relatively wide coupling gap between the workpiece and inductor to allow for tolerations in the dimensions of the workpiece, i.e. the distance between the inductor and the workpiece should exceed at least 2.0 mm. The inductor illustrated in FIGURE 1 would be expected to work with a coupling gap not exceeding 0.5 mm. to provide the desired heating effect.

The invention consists of an inductor for heating a surface layer on an elongate axially symmetrical workpiece having a flange at least at one end thereof, of the type comprising two elongate heating conductors adapted to extend lengthwise of and parallel to the shaft of the workpiece, and a conductor connecting the said parallel shaft, the improvement which consists of the connecting conductor having a rectangular U-shape, the legs of the U being of such a length that when the said inductor is in a heating position relative to the workpiece with the connecting conductor adjacent a flange of the workpiece, the connection between the said legs is at a distance from the elongate shaft portion so as to lie beyond the fillet between the shaft and the flange of the workpiece.

In a particular embodiment of the invention, a portion of each leg of the U-shaped connecting conductor is disposed at an angle so that the legs extend one towards the other where they join with the cross part of the U.

Each leg of the U-shaped cross conductor may be connected to an elongate heating conductor by a connection disposed at an angle to the elongate heating conductor.

To improve the heating effect or in order to impart directional properties to the heating effect, the cross-section of the legs and the cross-section of the connecting conductor between them may with advantage be relatively axially tilted, for instance at an angle of about 45°.

Figure 3:
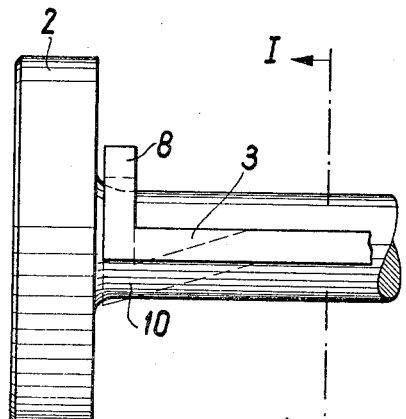
Figure 6:
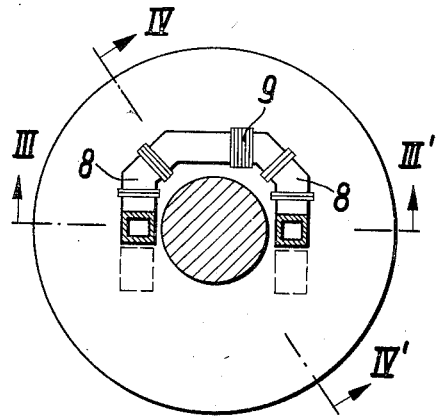
Figure 5:
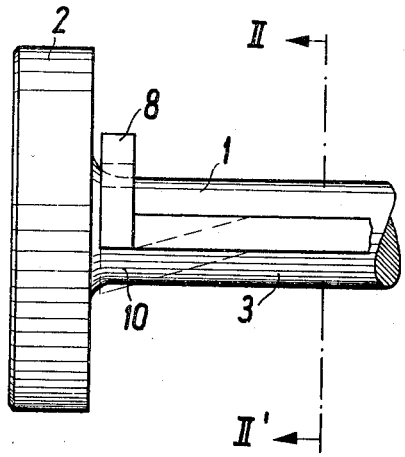
Figure 7:
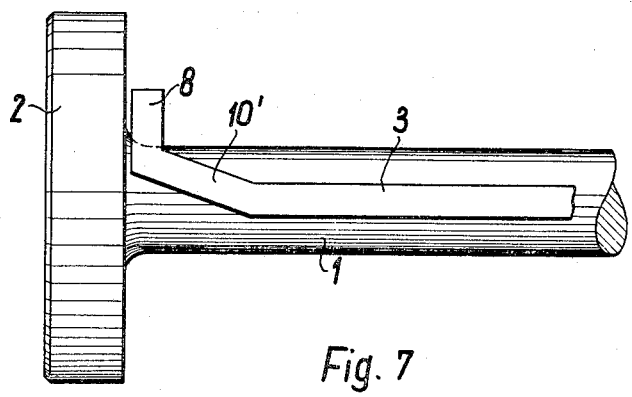
Figure 8:
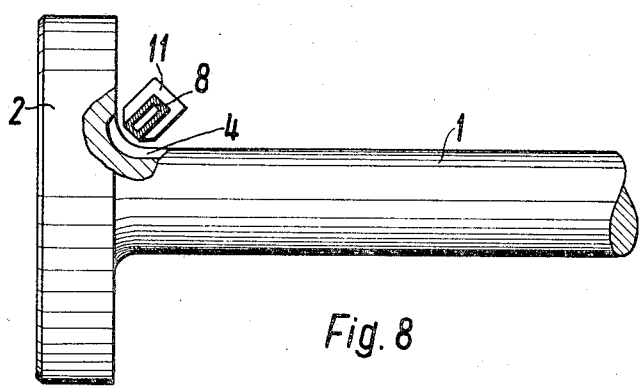
Figure 9:
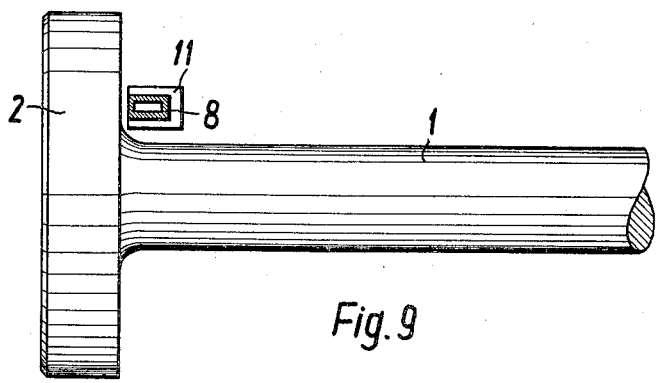

The invention will be hereunder more particularly described and illustrated by the accompanying drawings 2 to 9, of which FIGURE 2 illustrates the hardened zone of a workpiece to be treated, FIGURE 3 is a side elevation of the heating conductor and workpiece arranged according to the invention, in which the legs of the cross conductor may be connected to the elongate conductors by a connection disposed at an angle to the said legs, FIGURE 4 is a cross-section of the arrangement shown in FIGURE 3, taken on the line I–I', FIGURE 5 is a side elevation of another embodiment of the arrangement of the invention, in which the cross conductor of the inductor has portions angled towards each other, FIGURE 6 is a cross-section of the embodiment shown in FIGURE 5, taken on the line II–II', FIGURE 7 is a side elevation of another embodiment of the arrangement of the invention, in which the legs of the cross conductor are connected to the elongate conductors by a connection disposed at an angle to the said legs different from that shown in FIGURE 3, FIGURE 8 is a cross-section taken on the line III–III' of the arrangement shown in FIGURE 6 but showing only one leg cross-section, and FIGURE 9 is a cross-section taken on the line IV–IV' of FIGURE 6.

The said FIGURES 3 and 4 show the heating conductors of the inductor the invention provides for producing the desired hardened layer in an elongated flanged workpiece extending up the flange beyond the fillet. The inductor comprises conductors 3 extending parallel to the shaft surface lengthwise of the shaft, legs 8 of a rectangular U-shaped cross conductor and a connecting conductor 9 between the legs. As indicated in FIGURE 4 the legs 8 and the connecting conductor 9 may be provided with laminations.

FIGURES 3 and 4 also indicate a modified configuration of the heating conductors in dotted lines. In this modification the elongate heating conductor 3 and the legs 8 do not join at right angles but form acute angled corners 10. This arrangement commends itself especially for application to workpieces having a large diameter shaft and a thick flange, in which the fillet and the face of the flange require hardening to a greater depth, since the effective conductor length is greater and more laminations can be mounted on the arched part of the cross conductor to provide a more intense heating effect in the area that is to be hardened.

However, if desired, an obtuse angle may be formed at the junction. Such a configuration of the heating conductor is illustrated in FIGURE 7. This is a preferred arrangement for use with workpieces in which the diameter of the shaft is small and the flange thin, since it operates to prevent the workpiece from being overheated even if the coupling gap between the flange and the heating conductor is not increased with a consequent less well controlled heat distribution.

FIGURES 5 and 6 illustrate a configuration of the heating conductor, in which the legs 8 include portions which slope towards each other at an angle. This arrangement is particularly suitable for hardening a considerable proportion of the inside face of a flange that is not very thick. The heating conductor can be provided with laminations in a suitable way as indicated in the drawing, and inductor portions may be interposed to connect elongate conductors 3 and the corresponding legs 8, at an angle relative to the said legs.

A useful modification that may be effected to concentrate the induced heat in certain localities, consists in axially tilting the legs 8 in relation to the cross connection 9, as may be seen by comparing the disposition of the leg portions in FIGURES 8 and 9. The shank 8 provided with laminations 11, points towards the fillet 4 in FIGURE 8 and towards the face of the flange in FIGURE 9.

By combining several of the above described features, heated and hardened zones of a variety of configurations can be produced according to the nature of the treated workpiece.

What is claimed is:

1. An inductor for heating a surface layer on an elongate axially symmetrical workpiece comprising an elongate shaft portion having a flange at least at one end thereof and a fillet at the junction of the shaft portion and the flange said inductor being of the type comprising two elongated heating conductors, said elongated heating conductors being adapted to extend lengthwise of and parallel to the shaft portion of the workpiece, and a conductor forming an end of the inductor connecting the said parallel elongated heating conductors, the improvement which consists of the end connecting conductor having a U-shape, the legs of the U being parallel to one another and joined by a cross part lying at right angles to the said legs, the said legs being of such a length that when the said inductor is in a heating position relative to the workpiece with the connecting conductor legs and cross piece adjacent the fillet, the connection between the legs and the cross piece is at a distance from the elongate shaft portion so as to lie beyond the said fillet.

2. An inductor according to claim 1, in which a portion of each leg of the U-shaped connecting conductor is disposed at an angle so as to extend towards the other at the junction between the leg and the cross part.

3. An inductor according to claim 1, in which each leg of the said U-shaped connecting conductor is connected to an elongate heating conductor by an inductor connection disposed obliquely to a plane containing the elongate heating conductors and to a plane containing the U-shaped connecting conductor.

4. A method of inductively heating an elongate axially symmetrical workpiece comprising a shaft portion and a flange at least at one end thereof and a curved fillet between the shaft and the flange, which comprises arranging in heating relation to the workpiece an inductor comprising two elongate heating conductors connected at least at one end thereof by a connecting conductor having a U-shape with parallel legs and a connecting cross part at right angles to the legs, so that the connecting conductor lies adjacent the fillet and then by the so arranged inductor heating the fillet and a zone extending outside the fillet into the face of the flange.

5. An inductor for heating a surface layer of an elongate axially symmetrical workpiece having a flange at least at one end thereof, of the type comprising two elongate heating conductors adapted to extend lengthwise of and parallel to the shaft of the workpiece, and a conductor connecting the said parallel shaft heating conductors, the improvement which consists of the connecting conductor having a U-shape, the shanks legs of the U being of such a length that when the said inductor is in a heating position relative to the workpiece with the connecting conductor adjacent a flange of the workpiece the connection between the said shanks legs is at a distance from the elongate shaft portion so as to lie beyond the fillet between the shaft and the flange of the workpiece, and in which the cross-sections of the said shanks legs of the said U-shaped connecting conductor are axially tilted with respect to the cross section of the connection between the said shanks legs.

6. An inductor according to claim 5, in which the said cross-sections of the said shanks legs and the connection between the said shanks legs are axially tilted at an angle of about 45°.

References Cited

UNITED STATES PATENTS

| | | | |
|---|---|---|---|
| 2,293,534 | 8/1942 | Denneen et al. | 219—10.79 X |
| 2,632,079 | 3/1953 | Body | 219—8.5 |
| 2,758,187 | 8/1956 | Tudbury | 219—8.5 X |
| 2,797,288 | 6/1957 | Kiemele et al. | 219—10.79 X |
| 3,188,440 | 6/1965 | Wokas | 219—10.43 |
| 3,337,200 | 8/1967 | Balzer | 219—10.57 X |

JOSEPH V. TRUHE, Primary Examiner

L. H. BENDER, Assistant Examiner

U.S. Cl. X.R.

219—10.41, 10.57, 10.79